May 3, 1960     S. K. LEHMAN ET AL     2,935,086
PILOT OPERATED VALVE ASSEMBLY

Filed April 18, 1955                                     3 Sheets-Sheet 1

SAMUEL K. LEHMAN
VICTOR B. SILBER
INVENTORS.

BY

ATTORNEYS.

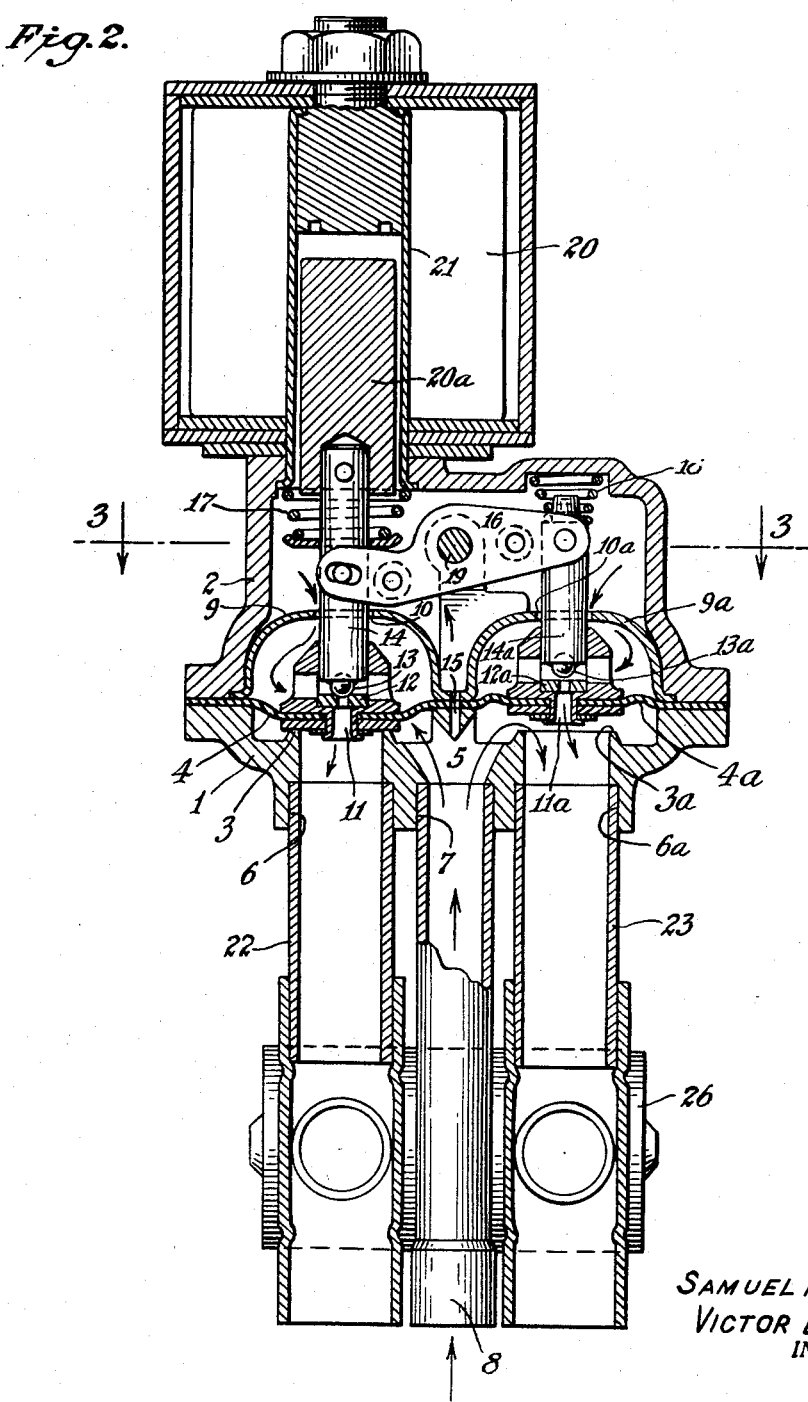

May 3, 1960 S. K. LEHMAN ET AL 2,935,086
PILOT OPERATED VALVE ASSEMBLY
Filed April 18, 1955 3 Sheets-Sheet 3

SAMUEL K. LEHMAN
VICTOR B. SILBER
INVENTORS.

BY
Kenyon & Kenyon
ATTORNEYS.

United States Patent Office 2,935,086
Patented May 3, 1960

2,935,086

PILOT OPERATED VALVE ASSEMBLY

Samuel K. Lehman, Brooklyn, and Victor B. Silber, Hewlett Harbor, N.Y.

Application April 18, 1955, Serial No. 502,044

10 Claims. (Cl. 137—599.1)

This invention relates to a pilot operated valve assembly adapted to handle fluid under pressure. More specifically, the valve is of the self-contained internal pilot operated solenoid type using a valve action of the diaphragm type.

One of the objects is to provide in one single compact and reliable valve for all of the kinds of valving ordinarily required and which normally necessitate the use of different valve designs in the case of each kind of application. Another object is to provide a diaphragm valve of the pilot operated type which requires a relatively small orifice for controlling the flow of pilot pressure when the pilot valve is opened, and which has the advantage that this relatively small orifice is self-cleaning so as to avoid its becoming clogged and preventing the valve from being worked. Still another object is to provide a valve assembly providing for the different types of operation previously described and, in addition, being adapted to function as a four-way valve when necessary. Other objects may be inferred from the following disclosure of a specific example of a valve embodying the principles of the present invention.

This valve is illustrated by the accompanying drawings in which:

Fig. 2 is a vertical section taken on the line 2—2 in Fig. 1;

Figure 1:
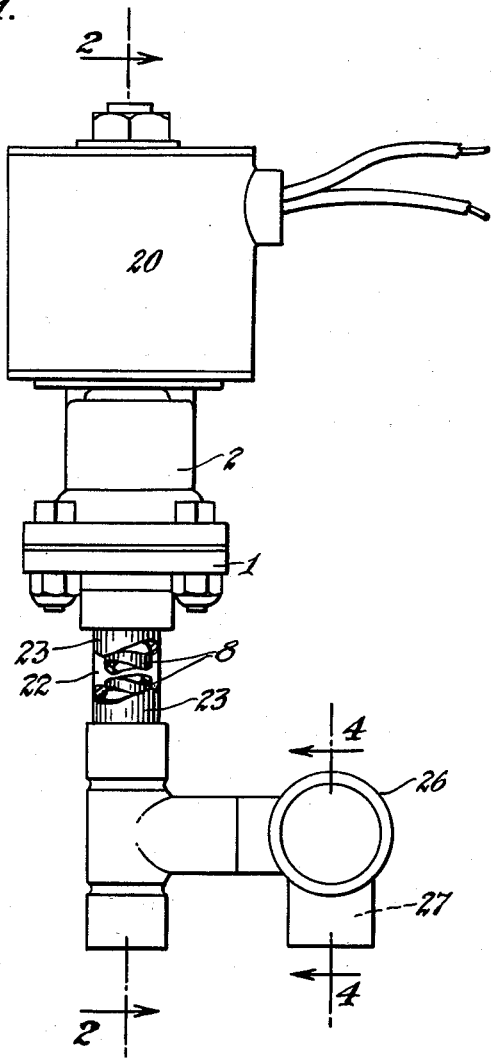
Fig. 1 shows this new valve in elevation.

This illustrated valve includes a casing formed by a lower part 1 and an upper part 2. The lower casing part 1 is formed to provide two valve seats 3 and 3a located adjacent to each other and both facing upwardly. The two parts of the casing cooperatively define space extending upwardly from the seats. Each seat is provided with a diaphragm valve 4 and 4a which are located within the casing. These two diaphragm valves may be formed by a single sheet of flexible material which is clamped between the casing parts 1 and 2 or entirely separate diaphragm valves may be used if desired.

These diaphragms divide the casing into front and rear enclosures for the diaphragms' fronts and backs, respectively. The front of the diaphragm valve is that side which faces the valve seat while the diaphragm valve's back is, of course, its other or upper side.

The front or lower enclosure, formed by the casing part 1 has a fluid inlet opening thereinto in each instance, this inlet being formed by passages 5. The lower part of the casing 1 is provided with a port 6 connecting with the seat 3, a port 6a connecting with the seat 3a, and a port 7 which connects with the passages 5 and, therefore, with both of the front enclosures. A pipe 8 is shown as being connected with the port 7 and this pipe is the one which receives the fluid under pressure and sends it to the valve assembly for control by the latter. Therefore, the full pressure of the fluid is applied to the bottoms or fronts of both diaphragm valves at all times. Within the rear enclosure, formed by the upper casing part 2, two walls in the form of domes 9 and 9a are located so as to in each instance form a chamber enclosing the back of the diaphgam valve with which the dome is associated. These domes or walls 9a are rigid and may be formed from a single piece of material and provided with a peripheral flange which, like the diaphragm valve member, is clamped between the parts 1 and 2. The dome 9 forms a chamber enclosing the back of the valve 4 and the dome 9a forms a second chamber enclosing the back of the valve 4a. Each dome has an opening, 10 and 10a, respectively, which is located opposite to the center of the back of the diaphragm valve with which it is associated. A passage is formed centrally through each of the diaphragm valves, as shown at 11 and 11a, respectively. The upper end of each of these passages has a pilot valve seat 12 and 12a, respectively, on which pilot valves 13 and 13a, respectively, seat. These valves are in the form of balls which are in each instance fixed to upwardly extending rods 14 and 14a, respectively, these rods extending upwardly through the openings 10 and 10a in each instance and the rods and openings being dimensioned so annular spaces are formed between each rod and its dome or wall 9 or 9a as the case may be.

The fluid pressure has access to the space within the casing part 2 above the walls 9 and 9a by reason of the valve casing having a passage 15 which extends upwardly from the passages 5 and through holes formed in the diaphragm valve member and the member providing the domes 9 and 9a. Therefore, the full pressure of the fluid, which is handled by the valve assembly, has access through the annular spaces described to the backs or tops of each diaphragm valve as well as to their bottoms or fronts.

The proportions of the rods and the holes through the domes 9 and 9a are such that the annular spaces previously mentioned have smaller cross sectional areas than the cross sectional areas of the passages 11 and 11a which are formed through the two diaphragm valves so as to connect the rear enclosures of these valves with their front enclosures and with the insides of their respective valve seats.

In operation the fluid pressure sends pilot pressure through the passage 15 and the described annular spaces to the backs of each diaphragm valve. If its pilot valve is opened the pressure escapes through the larger passage 11 or 11a because the fluid flow is more rapid than it is through the annular space described and which has the smaller cross sectional area, and this permits easy opening of the diaphragm valve. When the pilot valve is closed the pressure on both sides of the diaphragm valve is equalized so the diaphragm valve may be pushed closed easily and when it is almost closed with its seat it snaps shut because the seat protects that portion of the front of the diaphragm valve from the fluid pressure with the result that the fluid pressure on the back of the diaphragm valve presses the latter shut.

The above operation requires a relatively small orifice which is provided by the annular space described before in the case of each of the diaphragm valve arrangements. The pilot valve operating rods 14 or 14a work up and down while defining these annular orifices and, therefore, these orifices receive a cleaning action whenever the valve assembly is operated. This prevents clogging or stoppages, caused by dirt or the like, of these necessarily small orifices.

Figure 3:
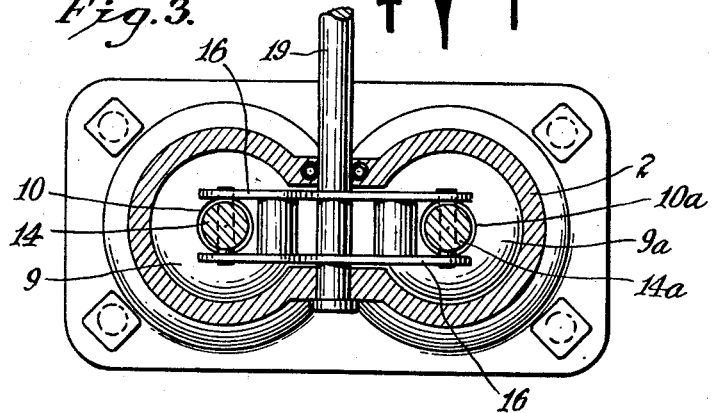
Fig. 3 is a cross section taken on the line 3—3 in Fig. 2.
Figure 4:
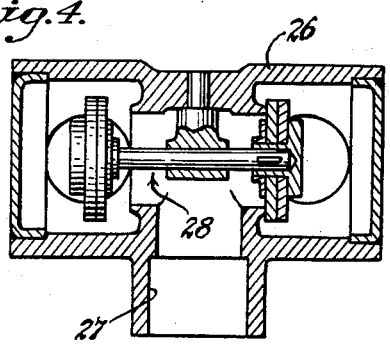
Fig. 4 is a vertical section taken on the line 4—4 in Fig. 1.

Each of the pilot valve operating rods 14 and 14a is mechanically connected with the other by a rocker arm 16 which is pivotally mounted inside of the upper casing part 2 above the domes 9 and 9a. This rocker arm 16 mechanically interconnects the two pilot valves for opposite operation. In other words, when the pilot valve rod 14 closes the pilot valve 13 and pushes downwardly on the diaphragm valve 4 the pilot valve rod 14a is lifted so as to open the pilot valve 13a while removing any downward pressure mechanically applied to the diagram valve 4a. With this arrangement a single coil spring 17 may apply downward pressure to one of the pilot valve rods or the rocker arm 16 so as to bias one of the pilot valves closed and the other open. The spring 18 shown by the drawings is only for the purpose of preventing loose play between the various pivots involved by the rocker arm 16. This arm is shown as being pivoted by being fixed to a horizontal shaft 19 which, as shown by Fig. 3, may extend through and beyond the outside of the casing of the valve assembly.

The actuating solenoid 20, which may be of the conventional type, is mounted on top of the casing part 2 with its armature 20a connected to the pilot valve rod 14 which extends upwardly to permit this connection. When the solenoid 20 is energized by suitable electric power the armature 20a pulls upwardly on the rod 14 so as to open the pilot valve 13 and relieve the diaphragm valve 4 from the pressure of the spring 17. Simultaneously the pilot valve 13a is closed and the armature force is applied to close the diaphragm valve 4a. The reverse operation results when the solenoid 20 is de-energized, the spring 17 providing the necessary force.

It is to be understood that this electro-magnetic actuating device includes a non-magnetic tube 21 in which the armature 20a works and which is sealed fluid tightly at its upper end. The lower end of the tube 21 passes through an opening in the casing part 2 with which it is sealed in a fluid tight manner. Therefore, no fluid can escape from the valve casing.

It is to be noted that this new valve requires only the single valve casing and the single solenoid mechanism. This arrangement permits opposite actuation of the two diaphragm valves. The valve mechanisms themselves are relatively inexpensive as compared to the solenoid and the valve casing. It follows that the manufacturing cost of the new valve is not very much more than the cost of manufacturing a conventional valve of the same type.

With the fluid introduced to the casing by way of the pipe 8 and passages 5 it becomes apparent that the valve on the left is a normally closed valve while the valve on the right is a normally open valve. Therefore, if normally open valve operation is desired the port 6 may be plugged in any convenient fashion, and if normally closed operation is desired the port 6a is plugged, the other port in either instance being left unplugged and connected with the fluid circuit which it is desired to control. Thus the single valve takes the place of the two valves of different construction which would otherwise be required.

With the ports 6 and 6a both in use, as is illustrated, a three-way valve is obtained. When the solenoid 20 is de-energized the port 7 connects with the port 6a, and when this solenoid is energized the port 7 connects with the port 6.

Because the rocker arm shaft 19 projects through the casing part 2 it becomes possible to gang a plurality of these valve assemblies so that only one of these assemblies must be provided with the electro-magnetic actuator described. In such a case the various shafts 19 would be coupled together so that the single solenoid of one valve actuates the entire gang. This is a possibility because the valve assembly is of the pilot operated type so that little power is required to open and shut the various diaphragm valves. When shut the full line pressure, obtained from the fluid under pressure, is applied to the top or back of the closed diaphragm valve, whereas during actual movement of the valve or when the valve is opened the fluid pressure is equalized on the front and back of each partially opened or opened diaphragm valve. Pilot operation is reliable at all times because the necessarily small orifice required to provide the flow which is restricted with respect to the passage 11, in each instance, enjoys the self-cleaning action previously described. It is, of course, possible to make the passage or duct 15 large enough to assure against its clogging.

The hole or passage 15, the space within the casing above the domes 9a and the annular spaces between the pilot valve actuating rods and the domes 9 or 9a cooperatively form pilot pressure applying passages interconnecting the enclosures for the fronts and backs of the diaphragm valves. The front enclosures must also enclose the valve seats and the passages 11 and 11a function to interconnect the backs of the valves with the insides of their valve seats as required to bleed or relieve the pressure from behind the diaphragm valves to their portions protected by the seats from the line pressure when the valves are closed. The pilot pressure available, for working the diaphragm valves, increases as the cross sectional areas of the passages 11 and 11a decrease, so these passages are made small in diameter. The pilot pressure must be throttled by orifices which are even smaller in cross sectional area than are the just mentioned passages, so it becomes apparent why these orifices must be very small and tend to clog.

When a four-way valve is desired it is easily accomplished by modifying the valve assembly to the extent of connecting pipes 22 and 23 with the ports 6 and 6a. These pipes 22 and 23 each connect with a T-coupling 24 and 25, respectively, which in turn connect with the inlet ports of a shuttle valve 26 having an outlet port 27 and internally containing the usual shuttle valve assembly 28.

Figure 5:
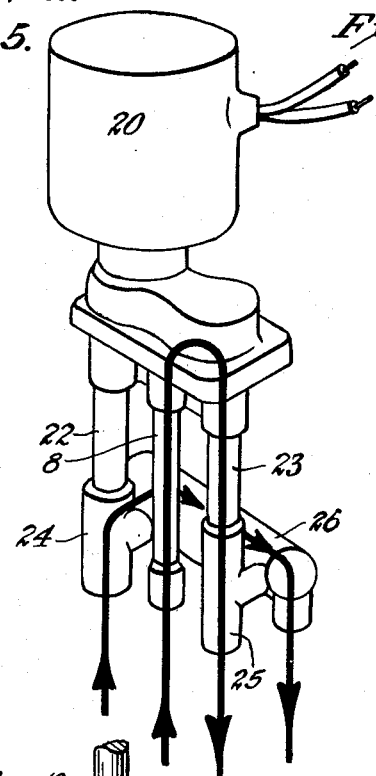
Fig. 5 is a perspective view of the valve schematically showing the fluid flow when the valve is used as a four-way valve.
Figure 6:
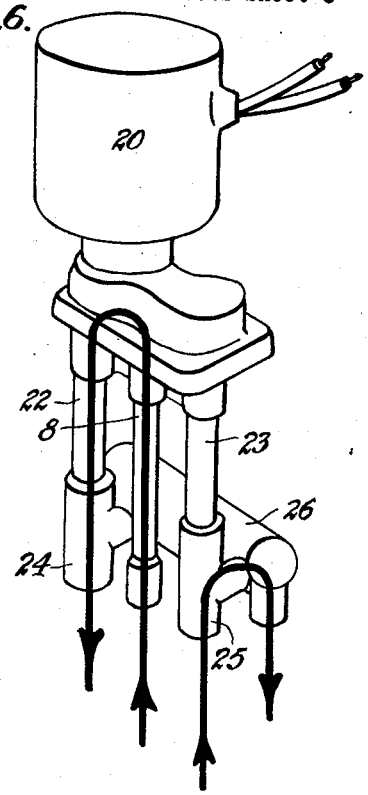
Fig. 6 is the same as Fig. 5 excepting that it schematically shows the four-way flow when the valve is reversed in its operation.

In this case, as shown by Figs. 5 and 6, when the solenoid is de-energized so that fluid flows through the pipe 23 the shuttle valve assembly 28 is shifted so as to connect the pipe 22, closed by the diaphragm valve 4, with the outlet port 27 of the shuttle valve 26. When the solenoid 20 is energized so that the flow is through the pipe 22 from the pipe 8, the shuttle valve is shifted so that the pipe 23, now closed by the diaphragm valve 4a, is connected with the shuttle valve's outlet port 27. Thus four-way valve operation is obtained by the simple addition of the shuttle valve 26.

The above described arrangement is of particular value when used to control reverse cycle air conditioning units which both heat and cool. Such units require a solenoid operated four-way change-over valve mounted in the refrigerant circuit. The four-way valve assembly of the present invention has the advantage that the hot and cold gases are not brought into physical proximity, thereby reducing the undesirable heat exchange between these gases involved in the case of prior art four-way valve constructions.

We claim:

1. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passage for connecting all of said front enclosures to receive said fluid, rear enclosures for said valve's backs, pilot pressure applying passage interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said pilot valves being located adjacent to each other, and means for mechanically interconnecting said pilot valves for relatively opposite actuation, spring means for biasing said pilot valves towards open and closed positions respectively, and a powered actuator connected to one of said pilot valves so that when operated the actuator reverses the position of said valve to which the actuator is connected.

2. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said pilot valves including moving operating rods, and walls enclosing individually said valves' backs and surrounding said rods and defining annular spaces therearound, said pilot pressure relief passages connecting through said spaces and being of greater cross sectional area, throughout their extents, than said spaces.

3. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said seats and their said diaphragm valves being located adjacent to each other and said pilot pressure relief passages being formed through said diaphragm valves, said pilot valves being located at said relief passages and adjacent to each other, and means for mechanically interconnecting said pilot valves for relatively opposite actuation, spring means for biasing said pilot valves towards open and closed positions respectively, and a powered actuator connected to one of said pilot valves so that when operated the actuator reverses the position of said valve to which the actuator is connected.

4. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures together and including a common inlet for said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said seats and their said diaphragm valves being located adjacent to each other and said enclosures each being formed by a single casing unit.

5. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures together and including a common inlet for said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said seats and their said diaphragm valves being located adjacent to each other and said enclosures each being formed by a single casing unit, said pilot pressure relief passages being formed through said diaphragm valves and said pilot valves, therefore, being located within said casing.

6. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures together and including a common inlet for said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said seats and their said diaphragm valves being located adjacent to each other and said enclosures each being formed by a single casing unit, said pilot pressure relief passages being formed through said diaphragm valves and said pilot valves, therefore, being located within said casing, and means for mechanically interconnecting said pilot valves for relatively opposite actuation.

7. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said seats and their said diaphragm valves being located adjacent to each other and said enclosures being formed by a single casing unit, said pilot pressure relief passages being formed through said diaphragm valves and said pilot valves, therefore, being located within said casing, said pilot valves having moving operating rods extending within said casing from the backs of said diaphragm valves, and chamber walls enclosing said backs and having openings through which said rods project, said pilot pressure applying passages being formed so as to connect with said backs through the spaces between said openings and said rods and said spaces being of smaller cross sectional areas than said pilot pressure relief passages.

8. A pilot operated valve assembly for fluid under pressure and including a casing having a valve seat and defining a space extending from this seat, a diaphragm valve for said seat and located within said casing and having a front facing said seat and an oppositely facing back and dividing said space into front and rear enclosures for said diaphragm valve's front and back respectively, said front enclosure also enclosing said seat and said casing having a fluid inlet opening into said front enclosure for introducing said fluid thereinto, a wall located within said rear enclosure and forming a chamber enclosing said diaphragm valve's back, said wall having an opening located opposite to said back, said diaphragm valve having a passage formed therethrough and being provided with a pilot valve, therefor, having a valve operating rod extending through said wall's opening so as to define an annular space therebetween, said annular space having a smaller cross sectional area than does said passage, and means for conducting said fluid from said diaphragm valve's front to said space at a location on the side of said wall opposite to said diaphragm valve's back.

9. A pilot operated valve assembly for fluid under pressure and including a casing having two valve seats located adjacent to each other and facing in the same direction, said casing defining space extending from said seats, a diaphragm valve for each of said seats and located within said casing and each having a front facing its seat and an oppositely facing back and dividing said space into front and rear enclosures for said diaphragms' front and back respectively, said front enclosures also enclosing said seats and said casing having an inlet for said fluid and opening into both of said front enclosures for introducing said fluid thereinto, walls located within said rear enclosures and forming chambers enclosing said diaphragm valves' backs, said walls having openings located opposite to said backs, said diaphragm valves having passages formed therethrough and being provided with pilot valves, therefor, having valve operating rods extending through said openings so as to define annular spaces therebetween, said annular spaces having smaller cross sectional areas than do said passages, means for conducting said fluid from said diaphragm valves' fronts to said space at a location on the sides of said walls opposite to said diaphragm valves' backs, a rocker arm located within said casing and interconnecting said rods for relatively reverse motion, a spring for biasing one of said pilot valve rods in one direction and powered means for moving said spring biased rod in the opposite direction.

10. A pilot operated valve assembly for fluid under pressure and including a plurality of valve seats, a diaphragm valve for each of said seats, each valve having a front facing its seat and an oppositely facing back, front enclosures for said seats and their valve fronts, means forming inlet passages for connecting all of said front enclosures to receive said fluid, rear enclosures for said valve's backs, pilot pressure applying passages interconnecting said front and rear enclosures of each of said valves for applying said fluid's pressure to the valve's back when the valve is seated, pilot pressure relief passages interconnecting the back of each of said valves with the inside of its seat and providing for a more rapid flow rate than said pilot pressure inlet passage in each instance, and a pilot valve for each of said pressure relief passages, said pilot valve being located adjacent to each other, and means for mechanically interconnecting said pilot valves for relatively opposite actuation, spring means for biasing said pilot valves towards open and closed positions respectively, and a powered actuator connected to one of said pilot valves so that when operated the actuator reverses the position of said valve to which the actuator is connected, said mechanically interconnecting means including a shaft projecting from said valve assembly and adapted for connection to the corresponding shaft of a similar but unpowered assembly.

References Cited in the file of this patent

UNITED STATES PATENTS

| | | |
|---|---|---|
| 2,376,918 | Hughes | May 29, 1945 |
| 2,486,608 | MacDougall | Nov. 1, 1949 |
| 2,553,940 | Quartullo | May 22, 1951 |
| 2,560,293 | Kempton | July 10, 1951 |
| 2,562,631 | Morrison | July 31, 1951 |
| 2,569,881 | Davies | Oct. 2, 1951 |
| 2,617,444 | Gardner | Nov. 11, 1952 |
| 2,623,534 | De Mart | Dec. 30, 1952 |
| 2,677,390 | Davis | May 4, 1954 |
| 2,708,092 | Smith | May 10, 1955 |

FOREIGN PATENTS

| | | |
|---|---|---|
| 671,470 | Great Britain | May 7, 1952 |